3,025,320
PROCESS FOR PREPARING ITACONIC ACID, AND 2,3-BUTADIENOIC ACID

Gian Paolo Chiusoli, Novara, Italy, assignor to Montecatini Societa Generale per l'Industria Mineraria e Chimica, Milan, Italy, a corporation of Italy
No Drawing. Filed June 5, 1959, Ser. No. 818,247
Claims priority, application Italy July 4, 1958
2 Claims. (Cl. 260—526)

The present invention relates to a process for preparing itaconic acid from propargyl chloride, carbon monoxide, nickel carbonyl and water.

Itaconic acid can be used for preparing plastics and polymers in general, and also as an intermediate for preparing tricarballylic acid. By a normal carboxo-synthesis, itaconic acid is transformed into tricarballylic acid which is thus prepared by a very simple method, starting with raw materials that are not very expensive.

The new synthesis of itaconic acid described herein involves the formation of an intermediate nickel complex, but it can be represented schematically as follows:

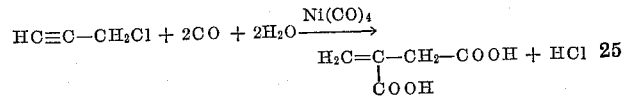

$$HC\equiv C-CH_2Cl + 2CO + 2H_2O \xrightarrow{Ni(CO)_4} H_2C=\underset{\underset{COOH}{|}}{C}-CH_2-COOH + HCl$$

From the reaction product other acids are also recovered, among which is 2,3-butadienoic acid.

In actual practice nickel carbonyl is decomposed during the reaction, but the amount of nickel carbonyl decomposed is lower than that corresponding to the reaction between the chlorine of the chloroderivative and the nickel.

Propargyl chloride can readily be prepared, according to a known technique, by chlorination of propargyl alcohol, which in turn is obtained from acetylene and formaldehyde.

The nickel transformed into nickel chloride during the reaction can be transformed again into nickel carbonyl by reaction of carbon monoxide with the nickel chloride ammonia solution, also according to a known technique.

The carbon monoxide utilized in the reaction is derived in part from nickel carbonyl and in part from that introduced as a gas.

The reaction takes place at a temperature of between 15° and 65° C., preferably at between 20° and 50° C., by contacting propargyl chloride with nickel carbonyl under a carbon monoxide current, in a medium containing water mixed with acetonitrile or acetone, in proportions ranging from 10% to 60% of water by weight. These solvents are preferred, although other inert solvents such as aliphatic ketones or nitriles can also be used.

The restriction of the water amount allows good quantities of itaconic acid to be obtained even without employment of hydrochloric acid in excess to that released from propargyl chloride.

The start of the reaction is evidenced by color formation varying from yellow to orange and brown red, which turns to green in case of defect of, or insufficient, nickel carbonyl. At the same time a temperature increase, due to the heat of reaction, is observed, which can be controlled by suitable cooling.

The synthesis can be suitably carried out by introducign nickel carbonyl and propargyl chloride into a vessel, into which a stream of carbon monoxide is passed, which may be in admixture with an inert gas, and containing water and the solvent. The amount of water should preferably be in excess of the stoichiometric amount. At least 20% excess is advantageous.

It is advantageous to carry out the reaction continuously, by recycling the gas, whereby loss of nickel carbonyl is avoided, while permitting better control of the reaction.

At the end of the reaction, the solvent and the unreacted nickel carbonyl, if any, are evaporated, and the aqueous nickel chloride solution, which remains together with the raw product, is extracted with ether to recover itaconic acid.

Other recovery treatments or steps are also applicable. For example, the aqueous solution is treated with sodium hydroxide, nickel hydroxide is filtered off, the solution is acidified again and the acid thus obtained is crystallized according to the known methods.

By washing the oily raw product with petroleum ether, the abovementioned 2,3-butadienoic acid can be extracted, which owing to its high reactivity can be employed as an intermediate for organic synthesis, viz. to make amides and esters and in diene reactions.

The process is characterized, in its preferred form, as one in which itaconic acid and 2,3-butadienoic acid are prepared by reacting propargyl chloride, in a ratio preferably not higher than 10% by weight of the reaction medium, with carbon monoxide, pure or in admixture with inert gases, such as nitrogen, nickel carbonyl in amount less than the stoichiometric amount needed for the formation of nickel chloride with the chlorine of the propargyl chloride, an organic solvent for the propargyl chloride that is substantially inert in the reaction, and water in excess of at least 20% in respect to the stoichiometric amount, and in a proportion of from 10% to 60% of water by weight, at a temperature between 15° and 65° C., and preferably between 20° and 50° C.

The following examples are illustrative, and are not intended to limit the scope of the present invention.

Example 1

2 grams propargyl chloride, 150 cc. acetone and 15 cc. water are placed in a 5-necked flask provided with a mechanical stirrer, reflux condenser, thermometer, gas-inlet tube and a cock funnel. A stream of 3 litres CO per hour is passed through the flask and the temperature is raised to 40° C. with a water bath. 30 cc. of an acetone solution containing 1.5 cc. nickel carbonyl is introduced through the funnel. After some time, the solution assumes an orange-yellow color. The addition of nickel carbonyl is continued in order that the color is maintained.

At the end of the reaction the color of the liquid is green-yellow and a small portion of nickel chloride in aqueous solution is precipitated. The entire reaction took 3 hours.

A nitrogen stream is then passed through the flask and acetone is evaporated. The residual mixture is then extracted with ether. The nickel content is determined in the aqueous nickel chloride solution, which amounts to 0.4 gram.

The residue from the ether extract weighs 2.7 g., and is an oil from which 0.5 gram of a crystalline solid, melting at between 158° and 162° C., are slowly separated. This solid, after recrystallization, gives pure itaconic acid.

The residual oil contains 2,3-butadienoic acid which is extracted with petroleum ether and recrystallized from the same; it melts at 65–66° C.

Example 2

1 gram propargyl chloride in 25 cc. acetonitrile is reacted at 50° C. in 50 cc. acetonitrile and 5 cc. water, by introducing it, simultaneously with 1 cc. nickel carbonyl in 25 cc. acetonitrile, into the solution under a carbon monoxide stream of 2 litres per hour.

After 3 hours, a nitrogen stream is introduced, the solution is treated with sodium hydroxide and is extracted with ether, acetonitrile is distilled off, the solution is acidified with sulfonic acid and extracted with ether.

The residue from the acid ether extract weighs 0.9 gram and separates itaconic acid (0.2 g.).

*Example 3*

Into a small flask flushed with CO and containing 25 cc. acetonitrile and 2 cc. water, 0.5 gram propargyl chloride and 0.5 gram nickel carbonyl are introduced at 25° C. After standing for 12 hours, nitrogen is introduced and 0.15 g. itaconic acid are extracted as described above.

*Example 4*

10 grams propargyl chloride in 50 cc. acetone are reacted at 45–50° C. with 3 cc. nickel carbonyl in a small glass column provided with a porous diaphragm, filled with 200 cc. acetone and 20 cc. $H_2O$, through which 50 litres CO per hour are passed in a closed cycle. The solution is treated as in the preceding examples. The presence of 0.9 g. nickel is determined in the aqueous solution. By extraction with ether 13 g. of an oil, from which 1 g. itaconic acid is separated, are recovered.

*Example 5*

To 1 g. propargyl chloride, dissolved in 100 cc. acetone and 20 cc. water in a flask provided with a mechanical stirrer and kept at 42–48° C., 2 g. nickel carbonyl dissolved in 10 cc. acetone are added within 1 hour, while 4 litres carbon monoxide per hour are passed through the solution. The solution assumes first an orange color and then the greenish color of the aqueous nickel chloride solutions. After 2 hours, the solvent is removed by distillation and the acid solution is extracted with ethyl ether.

1.2 grams are recovered which become solid. After washing with petroleum ether and standing on a porous plate, 0.6 raw itaconic acid, melting at 158–162° C., are recovered. From this the pure acid is recovered by crystallization from water.

The aqueous nickel chloride solution, which is again utilized for the preparation of nickel carbonyl by reaction with carbon monoxide, contains 0.28 g. nickel.

*Example 6*

Under the conditions of the preceding example, 1 g. propargyl chloride in 25 cc. acetone and 25 cc. water is reacted with 2 g. nickel carbonyl in 10 cc. acetone. After 2 hours the solvent is removed and 1.15 grams of a partially solid substance, are extracted with ethyl ether.

With petroleum ether 0.8 g. of raw acids are extracted, from which 2,3-butadienoic acid is crystallized. From the residue obtained by washing with petroleum ether, 0.2 gram itaconic acid are crystallized.

The nickel chloride solution contains 0.15 g. nickel.

*Example 7*

2 grams propargyl chloride in 80 cc. acetonitrile and 20 cc. water are reacted at 50° C. with 4 g. nickel carbonyl. 3 litres carbon monoxide per hour are passed through the solution.

By operating as in the preceding examples, 1 gram of product soluble in petroleum ether, containing 2,3-butadienoic acid, and 1 gram of a pasty solid, soluble in acetone and containing itaconic acid, are recovered.

The nickel chloride ($NiCl_2$) solution contains 0.4 g. nickel.

I claim:

1. A process for preparing itaconic acid and 2,3-butadienoic acid, characterized in that propargyl chloride in a proportion not higher than 10% by weight of the reaction mixture, carbon monoxide, nickel carbonyl in an amount less than the stoichiometric amount needed for the formation of nickel chloride with the chloride of the propargyl chloride, organic solvent taken from the group consisting of acetone and acetonitrile, and water in excess of at least 20% in respect to the stoichiometric amount and in a proportion from 10% to 60% of the solvent by weight, are reacted in the range of 15° to 50° C., evaporating the organic solvent, extracting with ethyl ether and recovering itaconic acid and 2,3-butadienoic acid from the residue.

2. A process for preparing itaconic acid and 2,3-butadienoic acid, characterized in that propargyl chloride in a proportion not higher than 10% by weight of the reaction mixture, carbon monoxide, nickel carbonyl in an amount less than the stoichiometric amount needed for the formation of nickel chloride ($NiCl_2$) with the chlorine of the propargyl chloride, an organic solvent taken from the group consisting of acetone and acetonitrile, and water in excess of at least 20% in respect of the stoichiometric amount and in a proportion ranging from 10% to 60% of the solvent by weight, are reacted in the range of 15° to 65° C.

References Cited in the file of this patent

FOREIGN PATENTS

| | | |
|---|---|---|
| 621,520 | Great Britain | Apr. 11, 1949 |
| 781,805 | Great Britain | Aug. 28, 1957 |

OTHER REFERENCES

Reppe. Ann. Chem., Justus Liebigs 582, 1–25 (1953).
Jones et al.: J. Chem. Soc. (London),1954, 1865–1868.
Eglinton et al.: J. Chem. Soc. (London), 1954, 3197–3200.